United States Patent
Lu et al.

(10) Patent No.: US 10,791,324 B1
(45) Date of Patent: Sep. 29, 2020

(54) ON-CAR STRAY-LIGHT TESTING CART

(71) Applicant: Waymo LLC, Mountain View, CA (US)

(72) Inventors: Chen David Lu, Campbell, CA (US); Erik Chubb, Alameda, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/386,941

(22) Filed: Apr. 17, 2019

(51) Int. Cl.
| | |
|---|---|
| *H04N 17/00* | (2006.01) |
| *G03B 43/00* | (2006.01) |
| *G01M 11/00* | (2006.01) |
| *G01J 1/42* | (2006.01) |
| *G01J 1/02* | (2006.01) |
| *B60R 11/04* | (2006.01) |

(52) U.S. Cl.
CPC .......... *H04N 17/002* (2013.01); *G01J 1/0214* (2013.01); *G01J 1/4204* (2013.01); *G01M 11/30* (2013.01); *G03B 43/00* (2013.01); *B60R 11/04* (2013.01)

(58) Field of Classification Search
CPC ..... H04N 17/002; G01M 11/30; G03B 43/00; B60R 11/04; G01J 1/0214; G01J 1/4204
See application file for complete search history.

(56) References Cited

U.S. PATENT DOCUMENTS

| | | | |
|---|---|---|---|
| 4,102,580 A | 7/1978 | Wyman et al. | |
| 10,558,873 B2 * | 2/2020 | Hermalyn | G06K 9/2027 |
| 2013/0032705 A1 * | 2/2013 | Armstrong | G01W 1/10 |
| | | | 250/236 |
| 2014/0320658 A1 | 10/2014 | Pliefke | |
| 2015/0015713 A1 * | 1/2015 | Wang | H04N 7/18 |
| | | | 348/148 |

(Continued)

FOREIGN PATENT DOCUMENTS

| | | |
|---|---|---|
| EP | 2098849 | 5/2013 |
| KR | 10-1062619 | 9/2011 |

(Continued)

OTHER PUBLICATIONS

Andalibi et al, "Automatic Glare Detection via Photometric, Geometric, and Global Positioning Information," Society for Imaging Science and Technology, Jan. 29, 2017, 77-82(6).

(Continued)

*Primary Examiner* — Dominic J Bologna
(74) *Attorney, Agent, or Firm* — Fish & Richardson P.C.

(57) ABSTRACT

Methods, systems, and apparatus for a stray-light testing apparatus. In one aspect, the apparatus includes an optical assembly including a spatially extended light source and one or more optical elements arranged to direct light from the spatially extended light source along an optical path, a moveable frame supporting the optical assembly including one or more adjustable alignment features for guiding positioning of the stray-light testing apparatus relative to an onboard camera on a vehicle, and a shrouding mechanism attached to the frame and positioned on the frame such that, when the stray-light testing apparatus is aligned relative to the onboard camera on the vehicle and the optical path of the optical assembly is within the field of view of the onboard camera, ambient light exposure for the onboard camera is below a threshold.

19 Claims, 5 Drawing Sheets

(56) References Cited

U.S. PATENT DOCUMENTS

| | | | | |
|---|---|---|---|---|
| 2017/0091941 | A1* | 3/2017 | Atkinson | G03B 11/045 |
| 2017/0177000 | A1* | 6/2017 | Meyhofer | H04N 5/2257 |
| 2017/0223279 | A1* | 8/2017 | Mueller | G06T 7/80 |
| 2018/0316832 | A1* | 11/2018 | Gartrell | H02J 7/0013 |
| 2019/0293783 | A1* | 9/2019 | Breuer | G01S 13/867 |

FOREIGN PATENT DOCUMENTS

| | | |
|---|---|---|
| KR | 10-1138221 | 4/2012 |
| KR | 10-1182093 | 9/2012 |

OTHER PUBLICATIONS

Archer-soft.com [online]', "Security testing for self-driving cars: 5 best practices," Jan. 18, 2019 [retrieved on Apr. 9, 2019], retrieved from: URL<https://www.archer-soft.com/ru/blog/security-testing-self-driving-cars-5-best-practices>, 9 pages.

Bosch-presse.de [online],' "Bosch DAS 1000 calibration set: professional adjustment of sensors and cameras of driver assistance systems," Mar. 18, 2018, [retrieved on Apr. 9, 2019], retrieved from: URL<https://www.bosch-presse.de/pressportal/de/en/bosch-das-1000-calibration-set-professional-adjustment-of-sensors-and-cameras-of-driver-assistance-systems-151808.html> 8 pages.

electronic.nu [online]', "How to perform ECM testing of Autonomous Vehicles," Date, Jan. 18, 2019, [retrieved on Apr. 9, 2019], retrieved from: URL<https://www.electronic.nu/en/2017/09/08/how-to-perform-emc-testing-of-autonomous-vehicles/>, 10 pages.

Lambdares.com [online]', "Stray light analysis and design of optical imaging systems," Jul. 2017, [retrieved on Apr. 1, 2019], retrieved from: URL<https://www.lambdares.com/wp-content/uploads/support/tracepro/tracepro_webinars/Stray%20Light%20Presentation%20July%202017.pdf>, 25 pages.

Optikos.com [online]', "A complete optical measurement and testing system," Jan. 23, 2018, [retrieved on Apr. 1, 2019], retrieved from: URL<https://www.optikos.com/wp-content/uploads/2018/03/OpTest-Brochure_01.23.2018.pdf>, 20 pages.

Zong et al, "Characterization and correction of stray light in optical instruments," Proc of SPIE, Oct. 26, 2017, 6744:1-11.

PCT International Search Report and Written Opinion in International Appln. No. PCT/US2020/025902, dated Jul. 15, 2020, 9 pages.

\* cited by examiner

US 10,791,324 B1

ON-CAR STRAY-LIGHT TESTING CART

BACKGROUND

This specification relates to stray-light performance of cameras.

SUMMARY

This specification describes technologies relating to a testing apparatus to characterize performance of an onboard camera on a vehicle under various ambient conditions.

In general, one innovative aspect of the subject matter described in this specification can be embodied in a stray-light testing apparatus including an optical assembly including a spatially extended light source along an optical path, a moveable frame supporting the optical assembly including one or more adjustable alignment features for guiding positioning of the stray-light testing apparatus relative to an onboard camera on a vehicle, where positioning of the stray-light testing apparatus relative to the onboard camera using the adjustable alignment feature positions includes positioning the optical path of the optical assembly within a field of view of the onboard camera, and a shrouding mechanism attached to the frame and positioned on the frame such that, when the stray-light testing apparatus is aligned relative to the onboard camera on the vehicle and the optical path of the optical assembly is within the field of view of the onboard camera, ambient light exposure for the onboard camera is below a threshold. Other embodiments of this aspect include corresponding systems, apparatus, and computer programs, configured to perform the actions of the methods, encoded on computer storage devices.

These and other embodiments can each optionally include one or more of the following features. In some implementations, the stray-light testing apparatus further includes a control unit in data communication with the optical assembly and which is operable to perform the operations of performing a stray-light test on the onboard camera on the vehicle. The control unit can be in data communication with an onboard data collection unit for the onboard camera.

In some implementations, the spatially extended light source is generated in part using an off-axis parabolic mirror and/or includes one or more neutral density filters. Light from the spatially extended light source can be allowed to reach the onboard camera, e.g., during a stray-light testing measurement.

In some implementations, the positions of the adjustable alignment features, e.g., a bumper, can be adjusted in one or more dimensions. The shrouding mechanism can be selected from a group that consists of a baffle, a blackout curtain, and a dome structure. The shrouding mechanism can include fixtures to position the shrouding mechanism surrounding the onboard camera on the vehicle, e.g., using magnets, suction cups, etc.

In general, another innovative aspect of the subject matter described in this specification can be embodied in a method for determining stray-light performance of an onboard camera including aligning, using one or more adjustable alignment features, the stray-light testing apparatus with respect to the onboard camera, positioning a shrouding mechanism with respect to the onboard camera such that the ambient light exposure for the camera is below a threshold, selecting a first light intensity from multiple possible light intensities of the light source, exposing the onboard camera to the particular intensity of light from the light source and capture image data by the onboard camera, and determine, based on the captured images, performance metrics for the onboard camera.

These and other embodiments can each optionally include one or more of the following features. In some implementations, the method can further include providing, to a control unit in data communication with an optical assembly of the stray-light testing apparatus and an onboard data collection unit for the onboard camera, control instructions to capture image data, by the onboard camera and for each intensity of light from the light source, e.g., during an exposure of the onboard camera to the intensity of light from the light source.

In some implementations, aligning the stray-light testing apparatus with respect to the onboard camera includes aligning an optical path of the light source within a field of view of the onboard camera. Determining stray-light performance of the onboard camera can further include determining stray-light performance of the onboard camera at multiple angles of incidence of the light source within the field of view of the onboard camera.

In some implementations, positioning the shrouding mechanism with respect to the onboard camera, such that the ambient light exposure for the onboard camera is below the threshold, includes reducing ambient light exposure by 90 percent or more. Positioning the shrouding mechanism with respect to the onboard camera, such that the ambient light exposure for the onboard camera is below the threshold, can include a signal-to-noise ratio for the onboard camera corresponding to reduction of ambient light to below 25% of the dynamic range of the onboard camera.

Particular embodiments of the subject matter described in this specification can be implemented so as to realize one or more of the following advantages. An advantage of this technology is that it can be used to calibrate the stray-light performance of an onboard camera, in particular, the performance of the camera when illuminated by a spatially extended light source, e.g., the sun, high beams, or the like, without the influence of the ambient environment. By using an extended light source at infinity, the apparatus can be used to simulate conditions under which the camera captures at least a portion of the sun over a range of incident angles. Simulating the solar illumination conditions can assist in developing, for example, a rejection ratio for the on-board camera to improve camera performance under exposure conditions including stray-light sources. Testing conditions can be recreated to assess the effects of contaminants or environmental and/or operational effects on the optical surfaces in the camera's imaging pathway. A testing cart that can be aligned with respect to a particular onboard camera easily and in a repeatable manner can reduce operator error and improve efficiency in taking stray-light performance measurements.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Overview

Figure 1A:
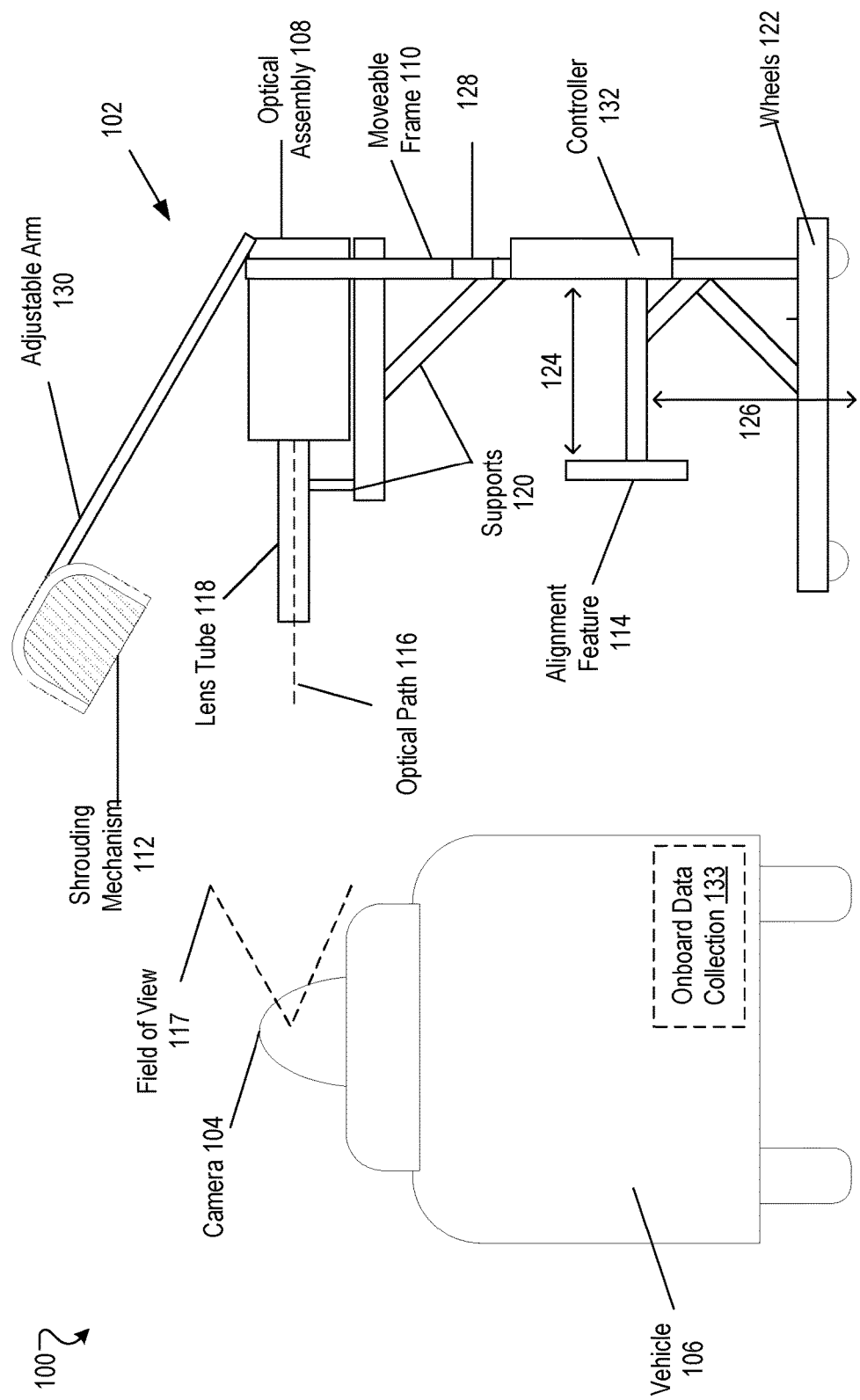
FIG. 1A is a block diagram of an example environment in which a stray-light testing cart can be utilized to characterize performance of an onboard camera of a vehicle.

The technology of this patent application is a stray-light testing apparatus to characterize performance of an onboard camera on a vehicle under stray-light conditions. The technology utilizes a spatially extended light source at infinity and a shrouding mechanism to obscure ambient light during testing conditions to simulate a stray-light source (e.g., the sun) that is illuminating a particular onboard camera of an autonomous/semi-autonomous car over a range of incident angles.

More particularly, the technology incorporates a spatially extended light source on a testing cart that can be positioned with respect to an onboard camera on a vehicle to characterize stray-light performance of the onboard camera, e.g., to simulate operation of the onboard camera when the sun or another high-intensity light source falls within the camera's field of view. The testing cart includes a light source including a high-intensity lamp (e.g., a xenon bulb or high-intensity light emitting diodes), an off-axis parabolic mirror, an iris to control spot size of the beam, a mechanism for adjusting light intensity output (e.g., using filters and/or light source intensity), and optionally, two rotational stages to adjust an angle of incidence of the spatially extended light source with respect to the camera. Additionally, the testing cart can include a controller that operates the light source, e.g., adjusts an intensity of the light source, turns the light source on/off, etc., and can optionally interface between the testing cart and an onboard data collection unit for the vehicle. The testing cart further includes a shrouding mechanism that can maintain the camera's exposure to ambient light below a threshold, while allowing the beam of light from the light source to reach the onboard camera, e.g., via a lens tube. The shrouding mechanism can be, for example, a blackout cloth, an adjustable baffle, a dome-like structure, or a combination thereof.

The testing cart can be used to perform a stray-light calibration test on the onboard camera. In a first step, the testing cart is aligned adjacent to a vehicle including an onboard camera, for example, using one or more alignment points. The onboard camera to be tested can be shrouded using the shrouding mechanism, and a "dark" reference measurement can be taken. In a second step, a "testing now" signal is provided to an onboard data collection unit for the vehicle being tested, and the onboard camera is exposed to the stray-light source from the testing cart for a length of time, for example, a few seconds. In a third step, a "dimming light" signal is provided to the onboard data collection unit and the stray-light source is dimmed, e.g., using a neutral density (ND) filter or similar, and the onboard camera is exposed to the dimmed light, again for a few seconds. In a final step, a "conclude test" signal is provided to the onboard data collection unit and the extended light source is blocked from exposing the camera, e.g., the light source can be turned off or shuttered. The stray-light calibration test can be repeated over a range of angles with respect to the camera, and can be repeated for each onboard camera of the vehicle.

Stray-Light Testing Cart

FIG. 1A is a block diagram of an example environment 100 in which a stray-light testing cart 102 can be utilized to characterize performance of an onboard camera 104 of a vehicle 106. The stray-light testing cart 102 includes an optical assembly 108, a moveable frame 110, and a shrouding mechanism 112.

Vehicle 106 can be a commercial or non-commercial vehicle, for example, a car, a truck, a bus, a flatbed, a trailer truck, or another piece of heavy machinery that is operated on a roadway. For example, vehicle 106 can be a car. In another example, vehicle 106 can be a public transit vehicle, e.g., a bus. Vehicle 106 can be an autonomous or semi-autonomous vehicle and includes onboard surveillance devices, e.g., a light detecting and ranging (LIDAR) system, onboard cameras, infrared cameras, sensors, global positioning system (GPS), telemetry devices, and the like.

An onboard camera module 104 is a camera mounted on vehicle 106 and can be positioned to record at least a partial view of an exterior environment of the vehicle 106. Generally, an onboard camera module includes one or more image sensors and optical components to image light onto the sensor(s). In some embodiments, for example, onboard cameras can include panoramic lens assemblies to provide a large field of view. Onboard camera module 104 of vehicle 106 is mounted on the roof of the vehicle 106 and can provide a 180 degree view of the environment surrounding vehicle 106. More generally, onboard camera modules can include a dashboard camera or a camera mounted on other exterior surfaces of the vehicle.

The optical assembly 108 provides a spatially extended light source along an optical path 116 that is partially enclosed by lens tube 118. A spatially extended light source is a light source having a finite size, as opposed to point-like, and subtends a given angle. Generally, when modeled or simulated, a spatially extended light source should be considered to be multiple incoherent point sources separated laterally rather than a single point source. The optical path 116 aligns with a field of view 117 of the onboard camera 104 when the stray-light testing cart 102 is aligned with respect to the camera 104 and vehicle 106. The optical assembly includes a light source and optical components, the details of which are described in further details with reference to FIGS. 2A-B.

The moveable frame 110 supports the optical assembly 108 and includes one or more adjustable alignment features 114 for guiding positioning of the stray-light testing cart 102 relative to the onboard camera 104 on the vehicle 106. Positioning of the stray-light testing cart 102 relative to the onboard camera 104 using the adjustable alignment feature positions 114 includes positioning the optical path 116 of the optical assembly 108 within a field of view 117 of the onboard camera, as is described in further detail with reference to FIGS. 2A-2B below.

Adjustable alignment features 114 include bumpers or other physical touch points on the frame 110 that can be used to align the frame 110 with respect to the camera 104 and vehicle 106. Adjustable alignment features 114 can include adjustable points on frame 110 that can alter one or more dimensions of the frame 110, e.g., raise/lower a position of optical assembly 108 with respect to the ground.

The moveable frame 110 includes supports 120, e.g., to secure the optical assembly 108 to the moveable frame 110, to secure adjustable alignment features 114 to the frame 110, and/or to stabilize the frame 110. For example, supports 120 can include angle brackets, L-shaped brackets, or the like. The frame 110, supports 120, alignment features 114, and other components of the stray-light testing cart 102 can be constructed from metal (e.g., aluminum, steel, etc.) and/or plastic materials.

The moveable frame 110 is configured to be moveable by rolling the frame 110 on wheels 122 to position the stray-light testing cart 102 adjacent to the vehicle 106. The frame 110 can be positioned manually by a human operator, where the human operator can roll the frame 110 on wheels 122 to align the frame 110 with respect to the camera 104 of the vehicle 106.

In some implementations, the moveable frame 110 can be positioned automatically or semi-automatically using linear motion actuators, servo-motors, or other electro-mechanical assistance for positioning the frame relative to the vehicle. The positioning of the frame 110 can be controlled by a controller utilizing one or more sensors to determine a position of the frame 110 relative to the vehicle 106. Semi-automatic positioning of the frame 110 can include electric drive and lift mechanisms to assist a human operator to move and position the frame 110.

Aligning the frame 110 with respect to the camera 104 of the vehicle 106 can be assisted by adjustable alignment features 114, where an alignment of the stray-light testing cart 102 includes positioning one or more of the adjustable alignment features 114 with respect to one or more points on or adjacent to the vehicle 106. The adjustable alignment features 114 can be bumpers or other touch-points where the frame is in physical contact with the vehicle 106 when the stray-light testing cart 102 is aligned with respect to the vehicle 106.

The adjustable alignment features 114 can be adjustable, for example, such that the stray-light testing cart 102 is compatible with multiple different vehicles 106, e.g., different makes/years/models of vehicle 106. The positions of the adjustable alignment features 114 can be adjusted in one or more dimensions. For example, a position of a bumper adjustable alignment feature 114 can be changed relative to the stray-light testing cart 102, e.g., a distance 124 from the frame 110 can be lengthened/shortened when, for example, the stray-light testing cart 102 is being utilized to test a camera 104 for a sedan or a minivan. In another example, a position of a bumper adjustable alignment feature 114 can be raised/lowered in height 126 with respect to the ground.

Adjustable alignment features 114 can be used to adjust one or more dimensions of the frame 110. For example, an alignment feature 128 can be used to raise and lower the frame 110 such that the optical assembly 108 is raised/lowered with respect to the ground. The adjustable alignment features 114 can include points of disassembly of the frame 110, e.g., so that the stray-light testing cart 102 can be moved through a narrow area, e.g., a door frame.

Figure 1B:
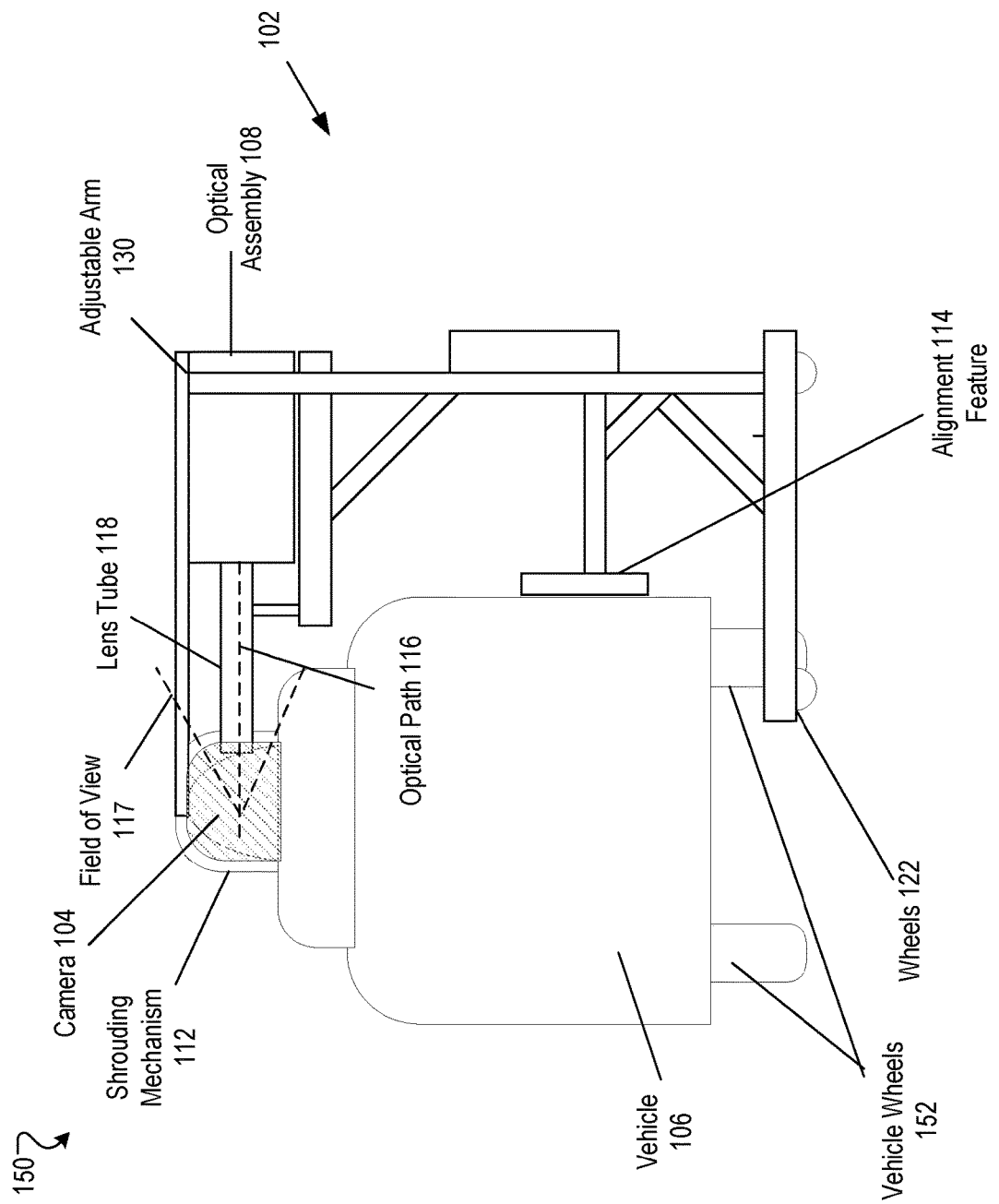
FIG. 1B is a block diagram of another example environment in which the stray-light testing cart is deployed.

In some implementations, the adjustable alignment features 114 can be used to adjust the frame 110 such that the stray-light testing cart can be used to test cameras 104 that are located at different points on vehicle 106. For example, a camera 104 can be located on top of the roof of vehicle 106, as depicted in FIGS. 1A and 1B. In another example, a camera 104 can be located on bumper or a side of vehicle 106. The adjustable alignment features 114 can be used to adjust one or more dimensions of the frame 110, e.g., adjust a location of optical path 116, and/or adjust locations of one or more bumpers or other touch-points to align the optical path 116 with the camera 104.

In some implementations, the adjustable alignment features 114 can be touch-free alignment features 114, for example, proximity sensors that provide alignment feedback for a relative position of the frame 110 to the vehicle 106 and camera 104. Proximity sensor data can be used to provide alignment feedback, e.g., audio feedback, textual feedback, haptic feedback, visual feedback, or the like, to a human operator. In one example, proximity sensors on the frame 110 can determine when the frame 110 is aligned with respect to vehicle 106 and camera 104 and provide, via an audio speaker, a series of chirps to indicate to a human operator that the frame 110 is correctly positioned.

In some implementations, the adjustable alignment features 114 can be part of an automated positioning system for the stray-light testing cart 102, where the automated positioning system requires minimal or no intervention from a human operator to position the frame 110 relative to the vehicle 106. The automated positioning system can be a part of an automated embodiment of the stray-light testing cart 102, where a human operator has minimal or no interaction with the stray-light testing cart 102 during the stray-light testing process.

The touch-free alignment features 114 can be used by linear or rotary motion actuators in an automated or semi-automated alignment process to align the frame 110 with respect to the vehicle 106 and camera 104. For example, proximity sensors can provide proximity data to a control system operating a servo-motor that positions wheels 122.

Shrouding mechanism 112 can be one or more of a baffle, a blackout curtain, or a dome shape and can be attached to the frame 110 by an adjustable arm 130. In some implementations, shrouding mechanism 112 can include fixture points, e.g., magnets, to attach the shrouding mechanism over the camera 104 on the vehicle 106. In one example, and as depicted in FIG. 1A, the shrouding mechanism 112 is a dome shaped structure on an adjustable arm 130 that can be positioned over the camera 104. In another example, the shrouding mechanism 112 is a blackout curtain that can be temporarily attached around the camera 104 to the body of the vehicle 106 by using magnets that are incorporated, e.g., sewn in, glued in, riveted in, etc., into the blackout curtain. In yet another example, the shrouding mechanism 112 is a flexible baffle that can be positioned to cover an area of the camera 104 including the field of view 117 of the camera 104. Further details of the shrouding mechanism are described below with reference to FIG. 1B.

The apparatus 102 includes a controller 132 that can be in data communication with the optical assembly 108 and control one or more operations of the optical assembly 108. For example, the controller 132 can operate a light source from the optical assembly, e.g., turning the light source on/off, adjusting an intensity of the light source, adjusting one or more optical components of the optical assembly 108, or the like.

In some implementations, the controller 132 can be in data communication with a data collection unit for the onboard camera 104. As described in further detail with reference to FIG. 3, a process for stray-light testing using the stray-light testing cart 102 can include a recording camera 104 performance under various stray-light conditions. Controller 132 can provide testing information to an onboard data collection unit 133, e.g., an onboard computer in data communication with camera 104, to record details related to the operation of the stray-light testing cart 102 during a testing process.

FIG. 1B is a block diagram of another example environment 150 in which the stray-light testing cart 102 is deployed. In FIG. 1B, the stray-light testing cart 102 is in an operating mode, where the stray-light testing cart 102 is aligned with the camera 104 of the vehicle 106 and the shrouding mechanism 112 is deployed. In some implementations, deploying the shrouding mechanism 112 includes moving, e.g., lowering, the adjustable arm 130 to position the shrouding mechanism 112 over the camera 104.

As depicted in FIG. 1B, stray-light testing cart 102 is aligned with respect to camera 104 on vehicle 106 such that the optical path 116 via the lens tube 118 of the optical assembly 108 is aligned with a field of view 117 of the camera 104. As aligned, the shrouding mechanism 112 on adjustable arm 130 is positioned on the frame 110 such that the ambient light exposure for the onboard camera 104 is below a threshold. Reducing ambient light below a threshold can be reducing a measurement of ambient light exposure to below 90% percent of full ambient light exposure. Reducing ambient light below a threshold can be reducing ambient light exposure to less than 25% of the dynamic range of a sensor of the camera 104 for a specific fixed exposure time. A threshold measurement can be defined as a signal-to-noise ratio or "dark measurement" below, for example, 25% of the dynamic range of the sensor of the camera 104 for a specific fixed exposure time. A background image can be captured by the camera 104 with the ambient light off and subtracted from an image captured by the camera with the ambient light exposed. Selecting a signal-to-noise ration can be based in part on the available dynamic range of the camera 104, where an amount of dynamic range used up by ambient light limits the sensitivity of the stray-light measurement.

In some implementations, when the stray-light testing cart 102 is aligned with respect to camera 104 on vehicle 106, a portion of the stray-light testing cart 102 is positioned underneath the vehicle 106, e.g., wheels 122 can be positioned underneath vehicle 106 between wheels 152 of the vehicle 106. When the stray-light testing cart 102 is aligned with respect to camera 104 on vehicle 106, one or more adjustable alignment features 114 can be in contact with the vehicle 106, e.g., a bumper in contact with a side of the vehicle 106.

Figure 2A:
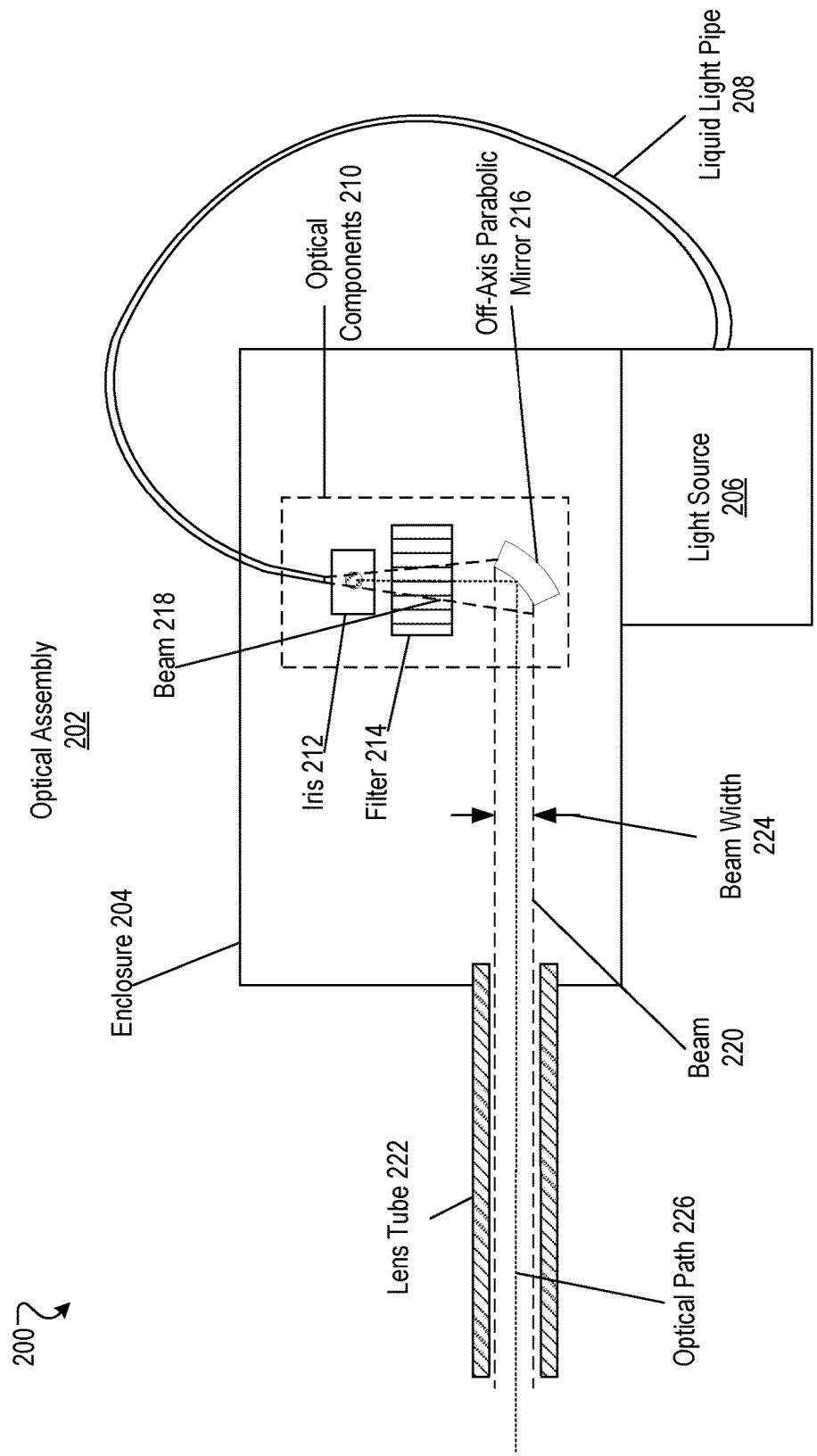
FIG. 2A is a block diagram of an example optical assembly for the stray-light testing cart.

FIG. 2A is a block diagram 200 of an example optical assembly 202 for the stray-light testing cart. Optical assembly 202, e.g., optical assembly 108 in FIGS. 1A and 1B, includes an enclosure 204 which can be attached to the frame 110 as depicted in FIGS. 1A and 1B. Enclosure 204 can be, for example, a metal enclosure, e.g., made of aluminum, or a plastic enclosure. Optical assembly includes a light source 206, for example, a light-emitting diode (LED) broad spectrum 6500 k source, a xenon bulb, an infrared 850 nm source, a hyper-spectral source, or the like. In some implementations, light source 206 is included within enclosure 204 or attached outside of the enclosure 204 to frame 110 of the stray-light testing cart 102. A liquid light pipe 208 directs light output from light source 206 to optical components 210.

Optical components 210 includes an iris 212, filter 214, and an off-axis parabolic mirror 216. Materials of the respective optical components 210 can be selected in part based on a range of wavelengths of light that is being tested using stray-light testing cart 102. For example, optical components 210 can be selected for optimal performance for a broadband of 450 nm-20 μm.

In some implementations, iris 212 is a fixed iris to set a spot size of beam 218 exiting from the liquid light pipe 208. In one example, iris 212 has a diameter determined by $$d=2f \tan 0.25° d=2f \tan 0.25°$$ (1)

where d is the diameter of the iris and f is the focal length of the off-axis parabolic mirror 216. The diameter d of the iris can range, for example, from 1-10 mm in diameter, e.g., about 2 mm, about 5 mm, etc.

Filter 214 is an optical filter to alter the transmitted light. Filter 214 can be, for example, a neutral density (ND) filter, a band-pass filter, an interference filter, a dichroic filter, an absorptive filter, etc. In some implementations, multiple filters 214 are included in an adjustable filter wheel, where a particular filter 214 of multiple filters 214 can be positioned within a path of the beam 218. In one example, multiple ND filters 214, e.g., optical density (OD) 0, 1, 2, 3, 4, 5, and 6, can be selected such that beam 218 can be adjusted to have variable intensity over a range of light output intensity.

Off-axis parabolic (OAP) mirror 216 is positioned with respect to beam 218 such that beam 218 over-fills the off-axis parabolic mirror 216 and produces a collimated beam 220 that is a spatially extended source at infinity. In some implementations, the spatially extended source at infinity can have an angular extent of 0.5°. The OAP mirror 216 can be oriented more than 15° degrees off-axis, for example, at 30° degrees or more, 60° degrees or more, such as 90° degrees off-axis.

A collimated beam 220 exits the enclosure 204 passes through lens tube 222. Beam 220 can have a beam width 224, for example, ranging between 25-100 mm. In one example, a beam width is 1.5 inches. Lens tube 222 can have a range of diameters, where a diameter of the lens tube 222 is larger than a beam width 220. Lens tube 222 can have a diameter, for example, ranging from 30-105 mm. In one example, lens tube 222 has a diameter of 2 inches. The lens tube 222 is positioned at the exit of the enclosure 204 such that the optical path 226 of the beam 220 is aligned parallel with the length of the lens tube 222.

Figure 2B:
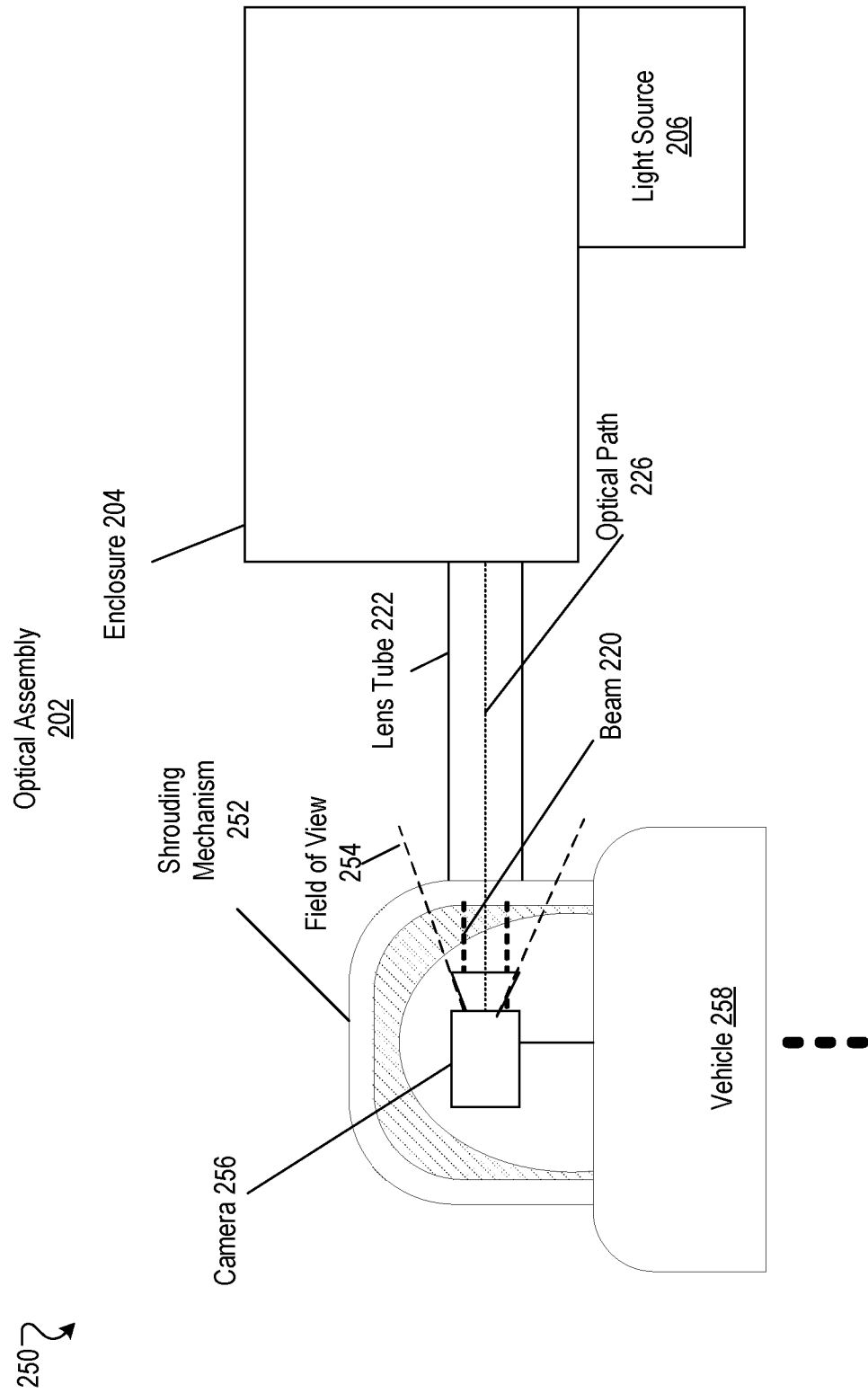
FIG. 2B is a block diagram of an example shrouding mechanism for the stray-light testing cart.

The optical path 226 can be directed into a field of view of a camera being tested by positioning the stray-light testing cart 102 with respect to the camera on the vehicle. FIG. 2B is a block diagram 250 of an example shrouding mechanism 252 for the stray-light testing cart.

As depicted in FIG. 2B, a shrouding mechanism 252 is positioned to reduce ambient light below a threshold. The shrouding mechanism 252 can be positioned, for example, using an adjustable arm, e.g., adjustable arm 130. Beam 220 from the optical assembly 202 passes through the lens tube 222 along an optical path 226 and into a field of view 254 of the onboard camera 256 of a vehicle 258.

In some implementations, the optical path 226 of the beam 220 from the optical assembly 202 can be adjusted over a range of angles of incidence, e.g., by adjusting a position of optical assembly 202 with respect to a field of view 254 of camera 256. For example, camera 256 can be a wide-angle camera such that performance of the camera 256 under stray-light conditions by the stray-light testing cart 102 requires testing over a range of incident angles of the beam 220 along optical path 226 onto camera 256.

Although described above as a stray-light testing cart 102 including frame 110 mounted on wheels 122, other embodiments are possible. In one embodiment, the stray-light testing cart 102 can be stationary, e.g., a fixed frame structure mounted on a floor, ceiling, and/or wall of a testing area, where a vehicle 106 can drive adjacent or through the stray-light testing cart 102. In one example, the stray-light testing cart 102 can be ceiling mounted in a testing area, e.g., in a warehouse setting, where the vehicle 106 drives underneath the stray-light testing cart 102 to have the performance of one or more onboard cameras 104 of the vehicle 106 tested under stray-light conditions. In another example, the stray-light testing cart 102 includes a frame 110 that is an arc-like structure through which the vehicle 106 drives to test the performance of onboard cameras 104 under stray-light conditions. In another example, frame 110 of the stray-light testing cart 102 is stationary and the vehicle 106 can be positioned relative to the stray-light testing cart 102, e.g., using a rotatable large turntable structure.

Example Process for Stray-Light Testing

Figure 3:
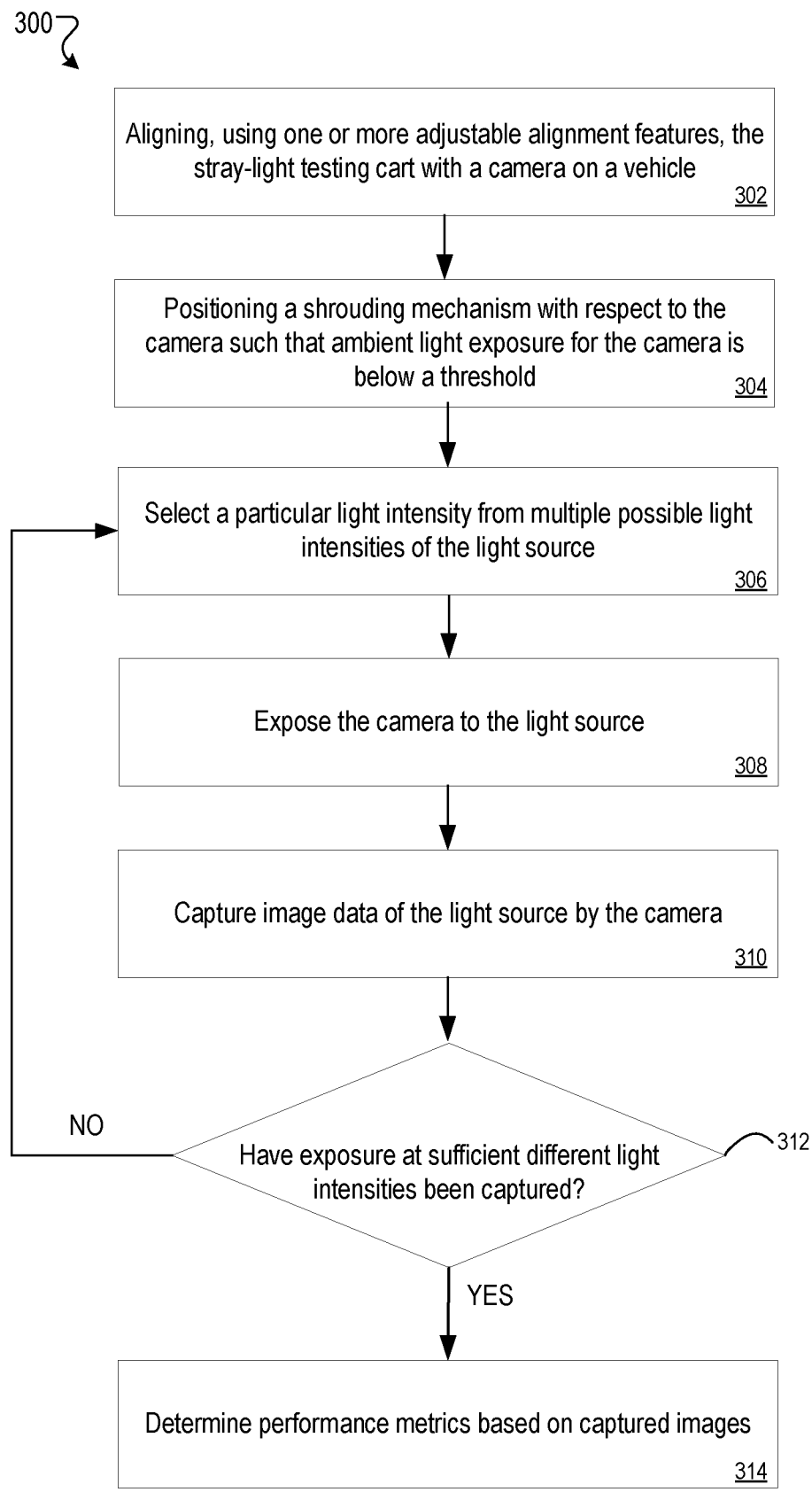
FIG. 3 is a flow diagram of an example process for utilizing the stray-light testing cart to characterize performance of an onboard camera of a vehicle.

FIG. 3 is a flow diagram of an example process 300 for utilizing the stray-light testing cart to characterize performance of an onboard camera of a vehicle. As described with reference to FIG. 1B above, the stray-light testing cart 102 is aligned with onboard camera 104 using one or more adjustable alignment features 114 (302). The alignment of the stray-light testing cart 102 can include positioning one or more physical alignment features, e.g., bumpers, of the stray-light testing cart 102 in physical contact with the vehicle 106. The alignment of the stray-light testing cart 102 can include adjusting one or more dimensions of the cart 102, e.g., raising/lowering the relative position of the optical assembly 108 with respect to the camera 104 such that the optical path 116 is within a field of view 117 of the camera 104.

The shrouding mechanism 112 is positioned with respect to the camera 104 such that ambient light exposure for the camera 104 is below a threshold (304). In one example, the threshold can be a reduction in ambient exposure by an amount ranging from 75-99%, e.g., by about 90% percent. In another example, the threshold is a signal-to-noise ratio corresponding to reduction of ambient light to below 25% of the dynamic range of the camera 104, e.g., a 4:1 signal-to-noise ratio. The shrouding mechanism can be positioned, for example, using adjustable arm 130. The shrouding mechanism can be positioned and temporarily affixed to the vehicle 106 and/or camera 104 using attached points, e.g., using magnets or the like.

A particular light intensity from multiple possible light intensities of the light source, e.g., the spatially extended light source, is selected (306). The particular light intensity can be selected, for example, using an ND filter, or another form of beam intensity attenuation. In one example, the light intensity can be attenuated using a ND filter having an optical density value of 4.0. In another example, the light intensity can be attenuated using a ND filter having an optical density values of 1.0. In yet another example, the light intensity can be attenuated by adjusting the light source power by 5% or more, 50% or more, or 75% or more, or the like.

The camera is exposed to the particular light intensity of the light source (308). Referring to FIGS. 1A and 1B, prior to light exposure, a testing initiation signal can be provided to an onboard data recording device for camera 104, e.g., an onboard computer on vehicle 106. For example, a "testing now" dialogue can be provided to the onboard data-recording device for the camera 104. In some implementations, controller 132 can provide a testing initiation signal to the onboard data-recording device for camera 104.

The extended light source, e.g., as depicted in FIGS. 2A and 2B, from the optical assembly 202 can be exposed to the camera 104 by turning on the light source (e.g., light source 206). In some implementations, the extended light source from the optical assembly 202 can be exposed to the camera 256 by opening a shutter, e.g., opening iris 212, removing a beam block, e.g., as part of the filter wheel 214, or another deflection of the beam 220.

Imaging data is captured of the light source by the camera (310). Light exposure incident on the camera 256 can be, for example, for a few seconds. Image data can be collected by the camera 256 and recorded, e.g., using an onboard data recording device. Image data can include measuring relative intensity of the stray-light versus the pixels of the two-dimension image for camera 256.

After collecting the image data for the particular light intensity, the beam 220 can be blocked from reaching the camera 256, e.g., using a shutter or other deflection method. A next light intensity of the multiple intensities of light can be selected to test, e.g., using a different filter 214 and/or dimming an intensity of light source 206. For example, an optical density 3.0 ND filter 214 can be inserted using a filter wheel into the beam 218 to reduce the light intensity of the light source 206.

Data related to the particular light intensity, e.g., a particular ND filter being used, or an intensity reduction of the light source, can be communicated to the onboard data-recording device for camera 256 to incorporate as metadata with the collected imaging data for the particular light intensity. In some implementations, metadata includes wavelength(s) of light being tested.

In some implementations, a dimming signal is provided to the onboard data-recording device for camera 256 prior to collecting a next exposure at the next light intensity, where the dimming signal can additionally include information about a filter or intensity reduction of the light source for reference. For example, a "testing at 75% intensity" dialogue can be provided to the onboard data-recording device for the camera 256.

A number of different light intensities from multiple possible light intensities are measured using the process described in steps 302-310 above (312). Multiple light intensities can be measured by attenuating the intensity of the light source using multiple calibrated ND filters each having a different optical density value and/or lowering an exposure of the camera. The number of different light intensities to be measured can be, for example, four or more different light intensities, two or more different light intensities, or the like. For example, if the relative intensity of 1 is captured with an ND filter of optical density value of 5.0, the extent of the light sources at relative intensities equal to $10^{-4}$ and $10^{-5}$ of the non-attenuated light source can be measured using ND filters having optical density (OD) 1.0 and OD 0.0, respectively.

After measuring camera performance at each light intensity of multiple light intensities, a test conclusion signal can be provided to the onboard data-recording device for camera 256. For example, a "conclude test" dialogue can be provided to the onboard data-recording device for the camera 256.

After each intensity of the multiple intensities is exposed to the camera 256, performance metrics are determined based on the captured images (314). Performance metrics characterize the performance of the camera under stray-light conditions, e.g., a glare spread function.

Performance of the camera can be quantized by a rejection ratio where the rejection ratio measures a radial extent of light at a ratio below an original source intensity, e.g., using the multiple reduced intensities of light source 206. The rejection ratio calculates the extent of the light source with an intensity above a specified relative intensity over a two-dimensional (2D) image captured by the camera. The intensity of the light source can be attenuated with multiple calibrated ND filters and/or lowering an exposure of the camera. For example, if the relative intensity of 1 is captured with an ND filter of optical density value of 5.0, the extent of the light sources at relative intensities equal to $10^{-4}$ and $10^{-5}$ of the non-attenuated light source can be measured using ND filters having optical density (OD) 1.0 and OD 0.0, respectively. The extent of the source in the 2D image is measured as the radius of the farthest extent from a center point of the source. The rejection ratio measurements can be used to define an extended source rejection ratio (ESRR).

In some implementations, performance of the camera can be quantized by a glare spread function describing the spatial effects of the light source over the camera 104, where stray-light causes the light source to spread over an image sensor of the camera 104 at high intensities. Multiple orders of magnitude of light intensity are measured by attenuating the light source, e.g., using multiple ND filters with different optical densities. An image is captured at each attenuated light intensity and a plot of relative intensity versus camera pixels is generated.

Performance metrics that are determined based on the process 300 can be utilized to compensate for stray-light conditions that a camera on a vehicle under nominal operating conditions. For example, performance metrics can be used to compensate for glare from the sun when the sun is within the field of view of the camera. In another example, performance metrics can be used to compensate for saturation of a camera by an infrared light source, e.g., when a LIDAR system for an autonomous or semi-autonomous vehicle is utilizing an 850 nm light source in LIDAR detection.

Performance of the camera 104 under stray-light conditions can be measured to isolate the origin of stray-light at a particular angle. Stray-light performance can be improved for the camera 104 by utilizing design choices, for example, by adjusting the baffling, applying a coating(s) to the windows or other optical surfaces, cleaning methods for the camera(s), lens design for the camera(s), and/or other like design and operational choices for the on-car camera system(s).

In some implementations, a range of angles can be measured using the process 300 described above. For example, an alignment of the stray-light testing cart 102 can be adjusted to position the optical path 116 (e.g., optical path 226) with respect to a field of view 117 (e.g., field of view 254) of the camera 104 (e.g., camera 256) that is being tested at a different angle of incidence. In some implementations, adjusting an angle of incidence of the optical path to the field of view of the camera can be performed by using one or more rotational stages in the optical assembly 108.

In some implementations, a vehicle 106 includes multiple cameras 104, where performance of each camera 104 under stray-light conditions can be characterized using the process 300 described above. For example, a vehicle 106 can include a camera 104 on a roof of the vehicle 106 and a camera 104 on a front bumper of the vehicle 106. Between testing processes 300 of each camera, one or more adjustable alignment features 114 of the stray-light testing cart may be adjusted to align the stray-light testing cart 102 to the particular camera 104 being tested of the multiple cameras 104 on the vehicle.

In some implementations, performance of a camera under stray-light conditions for multiple light sources can be tested using the stray-light testing cart 102. For example, light source 206 of FIG. 2A can include multiple different light sources, for example, a broadband 6500 k source and an infrared 850 nm source can be incorporated into light source 206 where each light source in turn can be utilized in the optical assembly 202, e.g., where liquid light pipe 208 can be adjusted to direct light from the different light sources into optical components 210 or a different liquid light pipe 208 can be used for each light source 206 to direct a light source 206 being utilized into optical components 210.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., compact discs (CDs), disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor; a computer; a system on a chip; or any number or combination of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a user computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A stray-light testing apparatus comprising:
an optical assembly comprising a spatially extended light source and one or more optical elements arranged to direct light from the spatially extended light source along an optical path;
a moveable frame supporting the optical assembly, the moveable frame comprising one or more adjustable alignment features for guiding positioning of the stray-light testing apparatus relative to an onboard camera on a vehicle, wherein positioning of the stray-light testing apparatus relative to the onboard camera using the adjustable alignment feature positions includes positioning the optical path of the optical assembly within a field of view of the onboard camera; and
a shrouding mechanism attached to the frame and positioned on the frame such that, when the stray-light testing apparatus is aligned relative to the onboard camera on the vehicle and the optical path of the optical assembly is within the field of view of the onboard camera, ambient light exposure for the onboard camera is below a threshold.

2. The apparatus of claim 1, further comprising a control unit in data communication with the optical assembly, and operable to perform the operations of performing a stray-light test on the onboard camera on the vehicle.

3. The apparatus of claim 2, wherein the control unit is in data communication with an onboard data collection unit for the onboard camera.

4. The apparatus of claim 1, wherein the spatially extended light source is generated in part using an off-axis parabolic mirror.

5. The apparatus of claim 1, wherein the spatially extended light source is adjustable over a range of angles.

6. The apparatus of claim 1, wherein the spatially extended light source includes one or more neutral density filters.

7. The apparatus of claim 1, wherein light from the spatially extended light source is allowed to reach the onboard camera.

8. The apparatus of claim 1, wherein the positions of the adjustable alignment features can be adjusted in one or more dimensions.

9. The apparatus of claim 1, wherein at least one adjustable alignment feature is a bumper.

10. The apparatus of claim 1, wherein the shrouding mechanism is selected from a group consisting of a baffle, a blackout curtain, and a dome structure.

11. The apparatus of claim 10, wherein the shrouding mechanism comprises fixtures to position the shrouding mechanism surrounding the onboard camera on the vehicle.

12. A method for determining stray-light performance of an onboard camera, the method comprising:
aligning, using one or more adjustable alignment features, a stray-light testing apparatus with respect to the onboard camera;
positioning a shrouding mechanism with respect to the onboard camera such that ambient light exposure for the camera is below a threshold;
selecting a first light intensity from a plurality of different light intensities from a light source;
exposing the onboard camera to the first light intensity from the light source; and
capturing image data by the onboard camera while exposing the onboard camera to the first light intensity from the light source; and
determining, based on the captured images, performance metrics for the onboard camera.

13. The method of claim 12, further comprising:
providing, to a control unit in data communication with an optical assembly of the stray-light testing apparatus and an onboard data collection unit for the onboard camera, control instructions to capture image data, by the onboard camera and for each intensity of light from the light source of the plurality of different light intensities from the light source.

14. The method of claim 12, wherein aligning the stray-light testing apparatus with respect to the onboard camera includes aligning an optical path of the light source within a field of view of the onboard camera.

15. The method of claim 14, wherein determining stray-light performance of the onboard camera further comprises determining stray-light performance of the onboard camera at a plurality of incident angles of the light source within the field of view of the onboard camera.

16. The method of claim 12, wherein positioning the shrouding mechanism with respect to the onboard camera such that the ambient light exposure for the onboard camera is below the threshold comprises reducing ambient light exposure by 90 percent or more.

17. The method of claim 12, wherein positioning the shrouding mechanism with respect to the onboard camera such that the ambient light exposure for the onboard camera is below the threshold comprises a signal-to-noise ratio for the onboard camera corresponding to reduction of ambient light to below 25 percent of a dynamic range of the onboard camera.

18. The method of claim 12, wherein the light source is a spatially extended light source.

19. The method of claim 12, wherein selecting the first light intensity of the plurality of light intensities from the light source comprises attenuating a beam of light from the light source using a neutral density filter.

* * * * *